(12) United States Patent
Younkins et al.

(10) Patent No.: US 9,726,094 B2
(45) Date of Patent: Aug. 8, 2017

(54) SYSTEM FOR MANAGING CATALYTIC CONVERTER TEMPERATURE

(71) Applicant: Tula Technology Inc., San Jose, CA (US)

(72) Inventors: Matthew A. Younkins, San Jose, CA (US); Ram Subramanian, Saratoga, CA (US); Leo Breton, Washington, DC (US)

(73) Assignee: Tula Technology, Inc., San Jose, CA (US)

( * ) Notice: Subject to any disclaimer, the term of this patent is extended or adjusted under 35 U.S.C. 154(b) by 485 days.

(21) Appl. No.: 14/548,138

(22) Filed: Nov. 19, 2014

(65) Prior Publication Data

US 2015/0136082 A1 May 21, 2015

Related U.S. Application Data

(60) Provisional application No. 61/907,218, filed on Nov. 21, 2013.

(51) Int. Cl.
*F02D 43/00* (2006.01)
*F02D 41/04* (2006.01)
(Continued)

(52) U.S. Cl.
CPC ....... *F02D 41/0087* (2013.01); *F02D 41/025* (2013.01); *F02D 41/06* (2013.01); *F02D 41/0255* (2013.01); *F02D 41/1446* (2013.01); *F02D 41/1454* (2013.01); *F02D 41/263* (2013.01); *F02D 2041/0265* (2013.01);
(Continued)

(58) Field of Classification Search
CPC ........ F02D 41/06; F02D 41/26; F02D 41/025; F02D 41/0087; F02D 41/0255; F02D 41/263; F02D 41/1454; F02D 41/1446; F02D 2200/0802; F02D 2200/0804; F02D 2041/0265
See application file for complete search history.

(56) References Cited

U.S. PATENT DOCUMENTS 4,434,767 A 3/1984 Kohama et al.
4,489,695 A 12/1984 Kohama et al.
(Continued)

FOREIGN PATENT DOCUMENTS

EP 0 404 320 6/1993

OTHER PUBLICATIONS

International Search Report dated Feb. 26, 2015 from International Application No. PCT/US2014/066445.
(Continued)

*Primary Examiner* — Hieu T Vo
*Assistant Examiner* — Arnold Castro
(74) *Attorney, Agent, or Firm* — Beyer Law Group LLP

(57) ABSTRACT

Various methods and arrangements for controlling catalytic converter temperature are described. In one aspect, an engine controller includes a catalytic monitor and a firing timing determination unit. The catalytic monitor obtains data relating to a temperature of a catalytic converter. Based at least partly on this data, the firing timing determination unit generates a firing sequence for operating the engine in a skip fire manner. Another aspect of the invention relates to an engine exhaust system that can help expedite the heating of a catalytic converter.

20 Claims, 3 Drawing Sheets

(51) Int. Cl.
  *F01N 3/20*   (2006.01)
  *F01N 11/00*  (2006.01)
  *F02D 41/00*  (2006.01)
  *F02D 41/06*  (2006.01)
  F02D 41/14    (2006.01)
  F02D 41/26    (2006.01)
  F02D 41/02    (2006.01)

(52) U.S. Cl.
  CPC .......... *F02D 2200/0802* (2013.01); *F02D 2200/0804* (2013.01); *Y02T 10/26* (2013.01)

(56) References Cited

U.S. PATENT DOCUMENTS

| | | |
|---|---|---|
| 4,494,503 A | 1/1985 | Danno et al. |
| 4,509,488 A | 4/1985 | Forster et al. |
| 5,377,631 A | 1/1995 | Schechter |
| 5,483,941 A | 1/1996 | Cullen et al. |
| 5,655,362 A | 8/1997 | Kawajiri et al. |
| 5,690,073 A | 11/1997 | Fuwa |
| 5,945,597 A | 8/1999 | Poublan et al. |
| 6,158,411 A | 12/2000 | Morikawa |
| 6,164,065 A * | 12/2000 | Denari ............ B01D 53/9431 60/284 |
| 6,257,207 B1 | 7/2001 | Inui et al. |
| 6,415,601 B1 | 7/2002 | Glugla et al. |
| 6,474,323 B1 | 11/2002 | Beck et al. |
| 6,571,772 B1 | 6/2003 | Ott et al. |
| 6,619,258 B2 | 9/2003 | McKay et al. |
| 6,769,398 B2 | 8/2004 | Surnilla et al. |
| 6,772,724 B2 | 8/2004 | Glugla et al. |
| 6,823,830 B2 | 11/2004 | Azuma |
| 7,000,602 B2 | 2/2006 | Cullen et al. |
| 7,032,545 B2 | 4/2006 | Lewis et al. |
| 7,032,572 B2 | 4/2006 | Bidner et al. |
| 7,032,581 B2 | 4/2006 | Gibson et al. |
| 7,063,062 B2 | 6/2006 | Lewis et al. |
| 7,066,136 B2 | 6/2006 | Ogiso |
| 7,086,386 B2 | 8/2006 | Doering |
| 7,124,717 B2 | 10/2006 | Gaessler et al. |
| 7,124,743 B2 | 10/2006 | Gonzales, Jr. et al. |
| 7,165,391 B2 | 1/2007 | Lewis |
| 7,165,520 B2 | 1/2007 | Lewis et al. |
| 7,249,583 B2 | 7/2007 | Bidner et al. |
| 7,458,346 B2 | 12/2008 | Gibson |
| 7,503,312 B2 | 3/2009 | Surnilla et al. |
| 7,532,972 B2 | 5/2009 | Kolmanovsky et al. |
| 7,650,745 B2 | 1/2010 | Lewis |
| 7,765,806 B2 | 8/2010 | Clark |
| 7,930,087 B2 | 4/2011 | Gibson et al. |
| 7,931,002 B1 | 4/2011 | Gibson et al. |
| 8,099,224 B2 | 1/2012 | Tripathi et al. |
| 8,225,771 B2 | 7/2012 | Aso et al. |
| 8,631,646 B2 | 1/2014 | Smith et al. |
| 8,689,541 B2 | 4/2014 | McDonald et al. |
| 8,931,255 B2 | 1/2015 | Wilson |
| 2001/0047792 A1 | 12/2001 | Akazaki et al. |
| 2002/0116917 A1 | 8/2002 | Glugla et al. |
| 2003/0010016 A1 | 1/2003 | Beer et al. |
| 2004/0237514 A1 | 12/2004 | Surnilla et al. |
| 2005/0000480 A1 | 1/2005 | Yasui et al. |
| 2005/0199220 A1 | 9/2005 | Ogiso |
| 2008/0066450 A1 | 3/2008 | Surnilla et al. |
| 2009/0150055 A1 | 6/2009 | Kaiser et al. |
| 2009/0301060 A1 | 12/2009 | Kennie et al. |
| 2010/0043744 A1 | 2/2010 | Suzuki et al. |
| 2010/0050993 A1 | 3/2010 | Zhao et al. |
| 2010/0100299 A1* | 4/2010 | Tripathi ............ F02D 41/0087 701/102 |
| 2011/0197860 A1 | 8/2011 | Aso et al. |
| 2011/0251773 A1 | 10/2011 | Sahandiesfanjani et al. |
| 2011/0295489 A1 | 12/2011 | Ma et al. |
| 2012/0042633 A1* | 2/2012 | Silvestri ............ F01N 3/208 60/274 |
| 2014/0041630 A1* | 2/2014 | Carlson ............ F02P 9/00 123/406.12 |

OTHER PUBLICATIONS

Written Opinion dated Feb. 26, 2015 from International Application No. PCT/US2014/066445.

International Preliminary Report on Patentability dated Nov. 5, 2015 from International Application No. PCT/US2014/066445.

\* cited by examiner

SYSTEM FOR MANAGING CATALYTIC CONVERTER TEMPERATURE

RELATED APPLICATIONS

This application claims priority of U.S. Provisional Patent Application No. 61/907,218, filed on Nov. 21, 2013 and which is hereby incorporated by reference in its entirety for all purposes.

FIELD OF THE INVENTION

The present invention relates generally to operation of an internal combustion engine. Various embodiments relate to using skip fire engine operation to control both exhaust gas temperature and the temperature of a catalytic converter. Some embodiments relate to various types of exhaust and engine control systems.

BACKGROUND

Most vehicles in operation today (and many other devices) are powered by internal combustion (IC) engines. An internal combustion engine typically has a reciprocating piston which oscillates within a working chamber or cylinder. Combustion occurs within the cylinder and the resulting torque is transferred by the piston through a connecting rod to a crankshaft. For a four-stroke engine, air, and in some cases fuel, is inducted to the cylinder through an intake valve and exhaust combustion gases are expelled through an exhaust valve. In typical engine operation the cylinder conditions vary in a cyclic manner, encountering in order an intake, compression, power, and exhaust stroke in a repeating pattern. Each repeating pattern may be referred to as a working cycle of the cylinder.

Internal combustion engines typically have a plurality of cylinders or other working chambers in which an air-fuel mixture is combusted. The working cycles associated with the various engine cylinders are temporally interleaved, so that the power stroke associated with the various cylinders is approximately equally spaced delivering the smoothest engine operation. Combustion occurring in the power stroke generates the desired torque as well as various exhaust gases. Some of these gases, such as carbon monoxide, hydrocarbons and nitrogen oxides, are pollutants that are harmful to human health.

Governments have implemented regulations to reduce the emission of such pollutants. As a result, modern vehicles include catalytic converters or some other emission control device, which help to remove the pollutants from the exhaust of the engine. One problem, however, is that that catalytic converters do not operate effectively at low temperatures, which are typically encountered when starting an engine. That is, hot exhaust from the fired cylinders must pass through the catalytic converter for a short period of time before it becomes warm enough to effectively filter pollutants. As a result, during the initial engine startup period, pollutants may pass through the catalytic converter without being captured.

There have been various efforts to more rapidly heat the catalytic converter during this startup period to limit the emission of harmful pollutants. One approach, which involves a secondary air injection system, is illustrated in FIG. 1. FIG. 1 is a representative block diagram including an engine 112 with two banks of cylinders 102a/102b, two upstream catalytic converters 106a/106b, a downstream catalytic converter 108 and an air pump 110. Each bank of cylinders is connected to an associated catalytic converter 106a/106b, each of which then are separately connected to a single downstream catalytic converter 108 via a Y pipe 111. During the engine startup period, a rich air-fuel mixture is delivered to all of the cylinders. The cylinders are fired and the resulting exhaust is passed from the cylinders to the upstream catalytic converters 106a/106b. Because of the rich air-fuel mixture, the exhaust contains unburned hydrocarbons, which enter the catalytic converters 106a/106b. The air pump 111 injects additional air into the catalytic converters. The air exothermically reacts with the hydrocarbons. The reaction more quickly heats the catalytic converter to a desired operating temperature.

Effective operation of a catalytic convert occurs over an operational temperature range; for example 400° to 600° F. Excessively high temperatures may damage the catalytic converter. Hot exhaust gases from an engine operating at high loads can exceed an operational temperature range of a catalytic converter and damage the catalytic converter.

Accordingly, there have been various modifications to avoid catalytic converter damage due to high exhaust gas temperature. Among those modifications are changes in the amount of fuel injected and limitations to the engine operating range.

SUMMARY

A variety of methods and arrangements for heating or controlling a temperature of a catalytic converter are described. In one aspect, an engine controller includes a catalytic monitor and a firing timing determination unit. The catalytic monitor is arranged to obtain data relating to a temperature of a catalytic converter. This data may be in the form of a catalytic converter temperature model and/or may involve a direct measurement or sensing of the temperature of the catalytic converter. The firing timing determination unit determines a firing sequence for operating the working chambers of the engine in a skip fire manner. The firing sequence is based at least in part on the catalytic converter temperature data.

Some implementations involve a skip fire engine control system that dynamically adjusts the firing fraction or firing sequence in response to a variety of conditions and engine parameters, including oxygen sensor data, exhaust gas temperature, barometric pressure, ambient humidity, ambient temperature and/or catalytic converter temperature. In various embodiments, the firing sequence is determined on a firing opportunity by firing opportunity basis or using a sigma delta converter.

In another aspect of the present invention, an engine exhaust system will be described. The engine exhaust system includes an upstream catalytic converter and a downstream catalytic converter. The exhaust system is coupled with an engine having two sets of working chambers, which are connected in a different manner to the downstream catalytic converter. Exhaust from the first subset of working chambers passes through the upstream catalytic converter before reaching the downstream catalytic converter. The exhaust from the second set of working chambers does not pass through any other catalytic converter before reaching the downstream catalytic converter. In various embodiments, an engine controller operates the engine during a startup period to fire only the first and not the second subset of working chambers until the downstream catalytic converter is within operating temperatures. In comparison to some prior art approaches, which utilize two upstream catalytic converters rather than one, this approach can help improve the heating and effectiveness of the catalytic converters.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale

DETAILED DESCRIPTION

Figure 1:
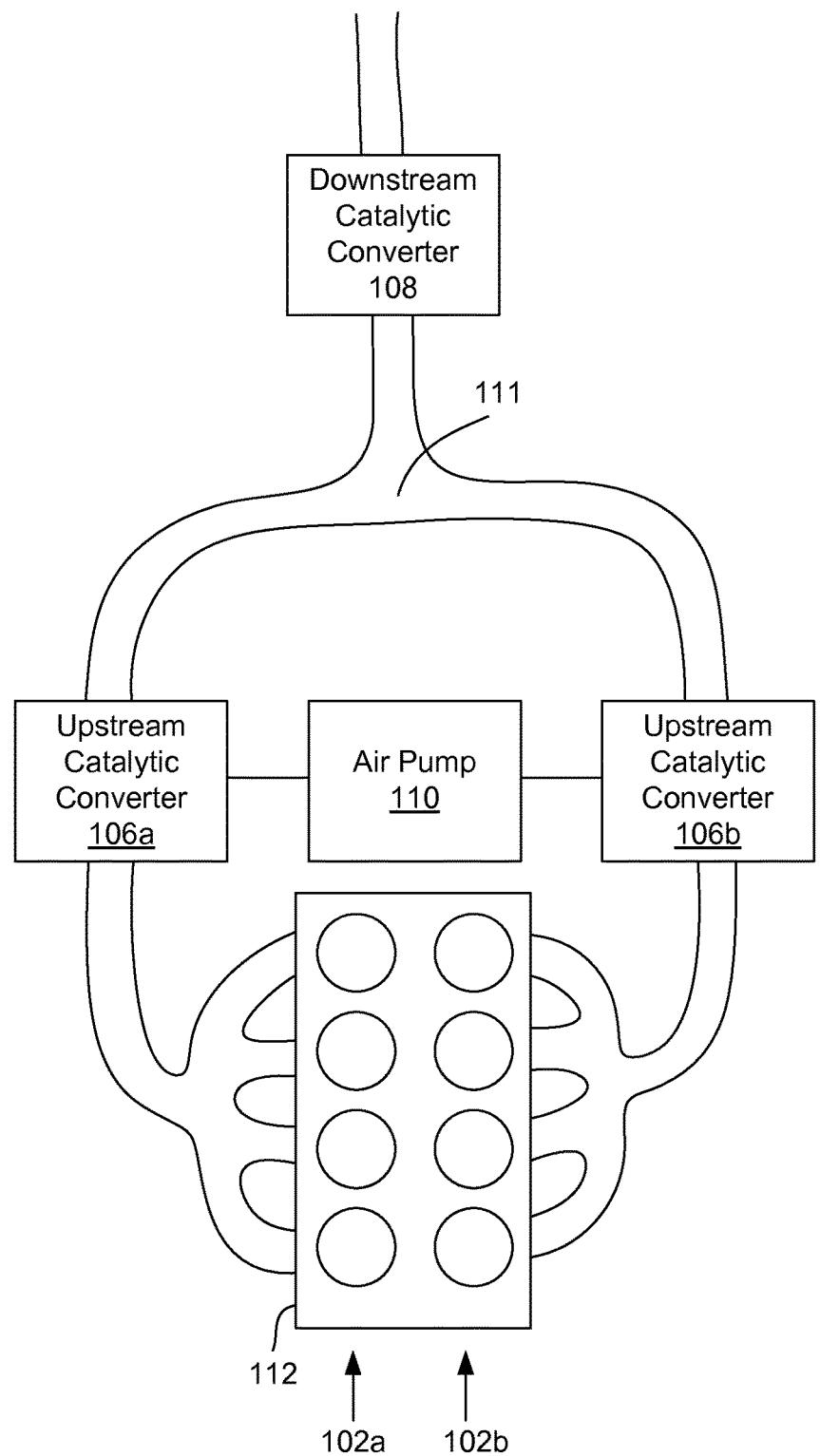
FIG. 1 is a diagram of a representative engine exhaust system.

As noted in the Background of the Invention, if a catalytic converter is below its light off or operational temperature, it is generally less effective at filtering pollutants from vehicle exhaust. This is particularly the case when the engine is activated from a cold start. As a result, it is generally desirable to rapidly heat the catalytic converter during this initial engine startup period. Many passenger vehicles using gasoline engines use 3-way catalytic converters. These catalytic converters can work well at oxidizing CO and hydrocarbon emissions and reducing NO emissions, to form $CO_2$, $H_2O$ and $N_2$. These catalytic converters typically operate at temperatures of 400° to 600° F. although lower or higher operating temperature ranges may be used. For proper long-term operation of a 3-way catalytic converter the engine must operate near stoichiometric air/fuel ratios so that the catalytic converter can both oxidize and reduce exhaust gas pollutants. For engines which generally do not operate with stoichiometric air/fuel ratios, such as compression ignition engines, other types of emission control devices may be used. These devices may take many forms such as selective catalyst reduction, Diesel particulate filter, Diesel oxidation catalyst or an $NO_x$ trap. These emission control devices also generally operate effectively only at elevated temperatures.

Various embodiments of the present invention address this issue. In some embodiments, the working chambers of an engine are operated in a skip fire manner to help control catalytic converter temperature. The skip fire firing sequence is adjusted based on data relating to catalytic converter temperature. This data can be obtained from a wide variety of sources, including exhaust gas temperature, ambient temperature, oxygen sensor data or any other suitable engine parameter.

In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional all-cylinder engine operation, in which all of the cylinders are fired. Skip fire engine operation is also different from variable displacement engine operation, in which a fixed set of the cylinders are deactivated during certain low-load operating conditions.

When skip fire engine operation is performed using optimized or nearly optimized firings (e.g., when MAP is within 30% of atmospheric pressure, etc.), the temperature of the resulting exhaust tends to be significantly greater than that of exhaust from conventional, non-skip fire operation, in which all the cylinders are fired, often under less optimal firing conditions. The hotter exhaust helps expedite the heating of the catalytic converter.

The present invention also contemplates techniques in which the skip fire firing sequence is dynamically adjusted based on a catalytic converter temperature model or a wide variety of suitable engine or vehicle parameters. In some approaches, for example, the firing sequence is determined on a firing opportunity by firing opportunity basis, although the determination can also be made somewhat less often (e.g., every two firing opportunities or more.)

Some implementations of the present invention also allow for the elimination of an auxiliary air pump. As noted in the Background of the Invention, in various prior art designs an auxiliary air pump delivers excess air to a catalytic converter that is used to create an exothermic reaction in the catalytic converter. This air can instead be provided by passing air through the skipped working chambers. That is, some skip fire engine operation modes involve firing or skipping selected working cycles of selected working chambers. Instead of deactivating and sealing the working chambers that are skipped, another option is to pass air through some or all of the skipped working chambers. A rich fuel-air mixture is delivered to the fired working chambers. The excess unburned hydrocarbons from the fired cylinders and the air from the skipped working chambers combine in the catalytic converter to generate the desired exothermic reaction. As a result, a secondary air pump is not necessary. These and other embodiments will be described below with reference to various figures.

Figure 2:
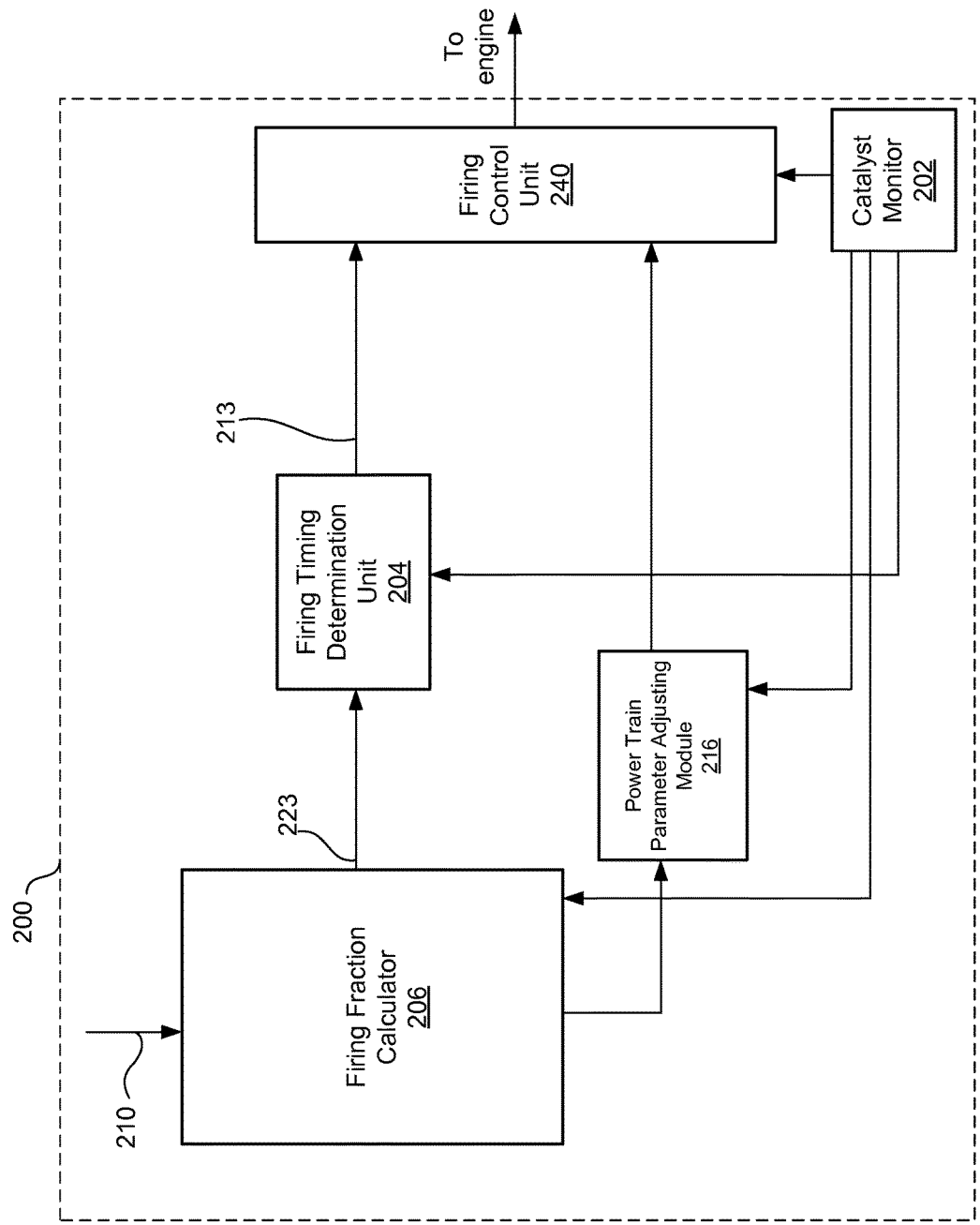
FIG. 2 is a skip fire engine controller according to a particular embodiment of the present invention.

Referring initially to FIG. 2, a skip fire engine controller 200 in accordance with one embodiment of the present invention will be described. The engine controller 200 includes a firing fraction calculator 206, a firing timing determination unit 204, a power train parameter adjusting module 216, a firing control unit 240 and a catalyst monitor 202. The firing control unit 240 receives input from the firing timing determination unit 204, the catalyst monitor 202 and the power train parameter adjusting module 216 and manages the operation of the working chambers of an engine based on the input.

The catalyst monitor 202 represents any suitable module, mechanism and/or sensor(s) that obtain data relating to a temperature of a catalytic converter. In various embodiments, for example, the catalyst monitor 202 obtains oxygen sensor data or monitors ambient air temperature, exhaust gas temperature, catalytic converter temperature, barometric pressure, ambient humidity and/or engine coolant temperature. This catalytic converter temperature data may be obtained using one or more sensors e.g., the oxygen sensor data may be obtained from one or more oxygen sensors that measure the amount of oxygen that goes into and/or comes out of a catalytic converter. In some embodiments, the engine controller 200 and the catalyst monitor 202 do not require a direct measurement or sensing of the temperature of the catalytic monitor. Instead, a catalytic converter temperature model is used. The model is based on one or more of the above parameters (e.g., oxygen sensor data, exhaust gas temperature, ambient temperature, barometric pressure, ambient humidity, etc.) that are representative or related to the catalytic converter temperature. In still other embodiments, the catalyst monitor or catalytic converter temperature model involves directly estimating or sensing the catalytic converter temperature. The catalyst monitor 202 transmits the catalytic converter temperature data to the power train parameter adjusting module 216, the firing timing determination unit 204, the firing control unit 240 and/or the firing fraction calculator 206.

In addition to the catalytic converter temperature data, the firing fraction calculator 206 receives input signal 210 that is indicative of a desired torque or other control signal. The signal 210 may be received or derived from an accelerator pedal position sensor (APP) or other suitable sources, such as a cruise controller, a torque controller, etc.

Based on the above inputs, the firing fraction calculator 206 is arranged to determine a skip fire firing fraction (i.e., commanded firing fraction 223). The firing fraction is indicative of the percentage of firings under the current (or directed) operating conditions that are required to deliver the desired output and catalytic converter temperature. Under some conditions, the firing fraction may be determined based on the percentage of optimized firings that are required to deliver the desired output and catalytic converter temperature (e.g., when the working chambers are firing at an operating point substantially optimized for fuel efficiency). It should be appreciated that a firing fraction may be conveyed or represented in a wide variety of ways. For example, the firing fraction may take the form of a firing pattern, sequence or any other firing characteristic that involves or inherently conveys the aforementioned percentage of firings.

The firing fraction calculator 206 takes into account a wide variety of parameters that might affect or help indicate the catalytic converter temperature. That is, the firing fraction is determined at least partly based on the catalytic converter temperature data received from the catalyst monitor 202. In some approaches, the firing fraction is based on, for example, oxygen sensor data, ambient air temperature, exhaust gas temperature, catalytic converter temperature, barometric pressure, ambient humidity, engine coolant temperature, etc. In various embodiments, as these parameters change with the passage of time, the firing fraction may be dynamically adjusted in response to the changes.

The method used to generate the firing fraction may vary widely, depending on the needs of a particular application. In one particular approach, the firing fraction is generated at least partly as a function of time. That is, a preliminary firing fraction value is generated that is adjusted in a predetermined manner depending on the amount of time that has passed since engine startup. The preliminary value may then be adjusted further based on any of the above parameters, such as ambient air temperature, exhaust gas temperature and/or oxygen sensor data. In various embodiments, some firing fractions are known to cause undesirable noise, vibration and harshness (NVH) in particular vehicle or engine designs, and such firing fractions may be adjusted or avoided. In still other embodiments, a firing fraction is selected based on the catalytic converter temperature data from a predefined library of firing fractions that have acceptable NVH characteristics.

In the illustrated embodiment, a power train parameter adjusting module 216 is provided that cooperates with the firing fraction calculator 206. The power train parameter adjusting module 216 directs the firing control unit 240 to set selected power train parameters appropriately to insure that the actual engine output substantially equals the requested engine output at the commanded firing fraction. By way of example, the power train parameter adjusting module 216 may be responsible for determining the desired mass air charge (MAC) and/or other engine settings that are desirable to help ensure that the actual engine output matches the requested engine output. Of course, in other embodiments, the power train parameter adjusting module 216 may be arranged to directly control various engine settings.

In some implementations of the present invention, the power train parameter adjusting module 216 is arranged to shift the engine between at least two different modes of operation. As previously noted, skip fire engine operation involves firing one or more selected working cycles of selected working chambers and skipping others. In a first mode of operation, the skipped working chambers are deactivated i.e., for the duration of the corresponding working cycle, the working chamber is sealed and therefore acts like an air spring. During the skipped working cycle, very little or no air is passed through the corresponding working chamber.

In a second mode of operation, the intake and exhaust valves for the skipped working chamber are not sealed during the corresponding working cycle and air is allowed to flow through the working chamber. In this mode of operation no combustion takes place in the skipped working chamber and the air pumped through the skipped working chamber is delivered to the catalytic converter. Uncombusted fuel is also delivered to the catalytic converter, either by delivery of a rich air fuel mixture to the fired working chambers or delivery of fuel, without combustion, to the skipped working chambers. In either case, the engine exhaust contains an excess amount of unburned hydrocarbons. The unburned hydrocarbons enter the catalytic converter and react exothermically with the air from the skipped working chambers. This reaction helps to heat the catalytic converter. Such an approach can be particularly useful during an engine start up period in which the catalytic converter needs to be rapidly heated in order to minimize the emission of pollutants. This approach also does not require a secondary air injection system (e.g., as shown in FIG. 1).

It should be appreciated that the skipped cylinders can be operated in either the first or second mode of operation, i.e. disabled or operating valves in a dynamic manner. That is on some working cycles a skipped cylinder may be operated with disabled valves and on a subsequent cycle with operating valves and on a following cycle with disabled valves. Whether a cylinder is skipped or fired is also controlled in a dynamic manner. This level of control allows optimization of the amount of oxygen delivered to the catalytic converter.

For example, initially from a cold start all engine and exhaust components are cold. It may be desirable to start the engine at a relatively low firing fraction, with firing cylinders at a nominally stoichiometric air/fuel ratio, and keep all the skipped cylinders in mode one to avoid pumping any air into the catalytic converter. Once the catalytic converter temperature has started to rise oxygen may be delivered to the catalytic converter by operating at least some of the skipped cylinders in the second mode. Unburnt hydrocarbon may simultaneously be delivered to the catalytic converter by running the firing cylinders at a rich air/fuel ratio or via fuel injection through the skipped cylinders operating in mode two. The oxygen and unburnt hydrocarbons may then exothermically react in the converter to more rapidly increase its temperature. This reaction may occur only once the catalyst converter is a least slightly warmed above ambient temperature and thus it may be desirable to only introduce oxygen and unburnt hydrocarbons to the catalytic converter once it has warmed slightly. Once the catalytic converter has reached its operational temperature all the skipped cylinders may be operated in mode one, sealed valves, to minimize engine pumping losses.

In various implementations, the power train parameter adjusting module 216 is arranged to cause the engine to shift between the two modes of operation based on the catalytic converter temperature data and/or other engine operating parameters. For example, in some approaches, if the engine controller determines that the temperature of the catalytic converter is too low (e.g., after a cold start), the power train parameter adjusting module will utilize the second mode of operation (e.g., a skip fire engine operation that involves the delivery of unburnt hydrocarbons to the catalytic converter) This mode of operation can help expedite the heating of the catalytic converter to a desired operating temperature. If, however, the engine controller determines that the temperature of the catalytic converter is high enough or has reached a light off temperature, the power train parameter adjusting module will shift to the first mode of operation (e.g., skip fire engine operation involving delivery of a normal or near stoichiometric air fuel mixture to the fired working chambers and deactivation of the skipped working chambers.)

There also may be situations in which the catalytic converter temperature is too high and further cooling is required. For example, Diesel engines are typically coupled with an emission control device that operates in a somewhat narrower band of operating temperatures. In some cases, the temperature of the emission control device may exceed this band. Similarly, hot exhaust gases from a gasoline engine operating at high loads can exceed a threshold temperature and damage a catalytic converter. It is desirable to avoid such situations, since excessive temperatures can damage or impair the performance of the emission control device. Accordingly, in some embodiments, the engine controller makes a determination as to whether the emission control device has exceeded a particular threshold temperature. If that is the case and the working chambers are being operated under the first mode of operation, then the power train parameter adjusting module may shift to a third mode of operation. In this mode of operation, selected working cycles of selected working chambers, instead of being deactivated, allow for the passage of air. The air that flows through the skipped working chambers passes into the emission control device and help cool the device. In contrast to the aforementioned second mode of operation, the fired working chambers are not operated using a rich air fuel mixture, so an exothermic reaction involving unburned hydrocarbons does not take place. Once the engine controller determines that the temperature of the emission control device is within a desired operating temperature band, the change in mode may be reversed and skip fire engine operation may resume in the first mode.

It should be appreciated that in some embodiments, different modes may be applied to different working cycles. In other words, during a selected working cycle of a particular working chamber, the working chamber may be operated in a second mode while in the very next working cycle, the corresponding working chamber will be operated in a first mode. In other words, in one working cycle, the skipped working chamber may allow for the passage of air, while in the very next firing opportunity that involves a skipped working chamber, the working chamber is deactivated and sealed. Changes in the delivery of air-fuel mixtures and the operation of the working chamber valves can change dynamically from one working cycle to the next and from one working chamber to the next in response to the catalytic converter temperature data and/or a variety of engine operating parameters.

The firing timing determination unit 204 receives input from the firing fraction calculator 206 and/or the power train parameter adjusting module 216 and is arranged to issue a sequence of firing commands (e.g., drive pulse signal 213) that cause the engine to deliver the percentage of firings dictated by the commanded firing fraction 223. The firing timing determination unit 204 may take a wide variety of different forms. For example, in some embodiments, the firing timing determination unit 204 may utilize various types of lookup tables to implement the desired control algorithms. In other embodiments, a sigma delta converter or other mechanisms are used. The sequence of firing commands (sometimes referred to as a drive pulse signal 213) outputted by the firing timing determination unit 204 may be passed to a firing control unit 240 which orchestrates the actual firings.

Some implementations involve selective firing of particular working chambers and not others. For example, during an engine startup period, the engine controller may fire only a particular subset of working chambers that are physically closer to a catalytic converter. Since exhaust from those working chambers has a shorter path to travel, the exhaust loses less thermal energy and can help heat the catalytic converter more quickly and efficiently.

The engine controller 200, firing fraction calculator 206, the power train parameter adjusting module 216 and the firing timing determination unit 204 may take a wide variety of different forms and functionalities. For example, the various modules illustrated in FIG. 2 may be incorporated into fewer components or have their features performed by a larger number of modules. Additional features and modules may be added to the engine controller. By way of example, some suitable firing fraction calculators, firing timing determination units, power train parameter adjusting modules and other associated modules are described in co-assigned U.S. Pat. Nos. 7,954,474; 7,886,715; 7,849,835; 7,577,511; 8,099,224; 8,131,445; and 8,131,447; U.S. patent application Ser. Nos. 13/774,134; 13/963,686; 13/953,615; 13/953,615; 13/886,107; 13/963,759; 13/963,819; 13/961,701; 13/963,744; 13/843,567; 13/794,157; 13/842,234; 13/004,839, 13/654,244 and Ser. No. 13/004,844; and U.S. Provisional Patent Application Nos. 61/080,192; 61/104,222; and 61/640,646, each of which is incorporated herein by reference in its entirety for all purposes. In various alternative implementations, these functional blocks may be accomplished algorithmically using a microprocessor, ECU or other computation device, using analog or digital components, using programmable logic, using combinations of the foregoing and/or in any other suitable manner.

There are various prior art patent publications that describe different engine control approaches for the engine startup period. However, the technologies described in these publications differ from the present invention in a variety of significant ways. For example, U.S. Pat. No. 5,690,073 (hereinafter referred to as the '073 patent) pertains to a fuel injection control device that is utilized during an engine startup period. In the '073 patent, one of several predefined startup patterns is selected for the cylinders depending on an assessment of the engine coolant temperature. Each pattern involves a sequence of firing opportunities in which during each firing opportunity, a normal or reduced amount of fuel is delivered to the corresponding working chamber. That is, in the '073 patent, the firings are not determined on-the-fly or on a firing opportunity by firing opportunity basis, but rather are selected at a single point in time prior to the commencement of the pattern. Only a single pattern is used prior to the commencement of all-cylinder operation and those patterns all involve either firing or skipping a given cylinder. That is, a cylinder is not fired on one cycle, skipped on a subsequent cycle and fired on the following cycle. Also, the firing pattern cannot be dynamically adjusted to compensate for changing or variable operating conditions. The invention disclosed in the '073 patent also differs from some embodiments of the present invention in that the selection of a particular injection pattern is based primarily on the coolant temperature and is not based on a catalytic converter temperature model or a sensed catalytic converter temperature. The '073 patent never discusses the implications of skip fire operation during start up on the catalytic converter performance.

In some embodiments, it may be desirable to use the skip fire pattern to more quickly increase the engine coolant temperature. Low engine temperatures have less lubrication between engine components and increased frictional drag. In general, it is possible to more quickly heat the engine coolant by operating a smaller number of cylinders at higher load, because the increased operating temperatures associated with the higher load increase the heat transfer to the engine coolant.

Figure 3:
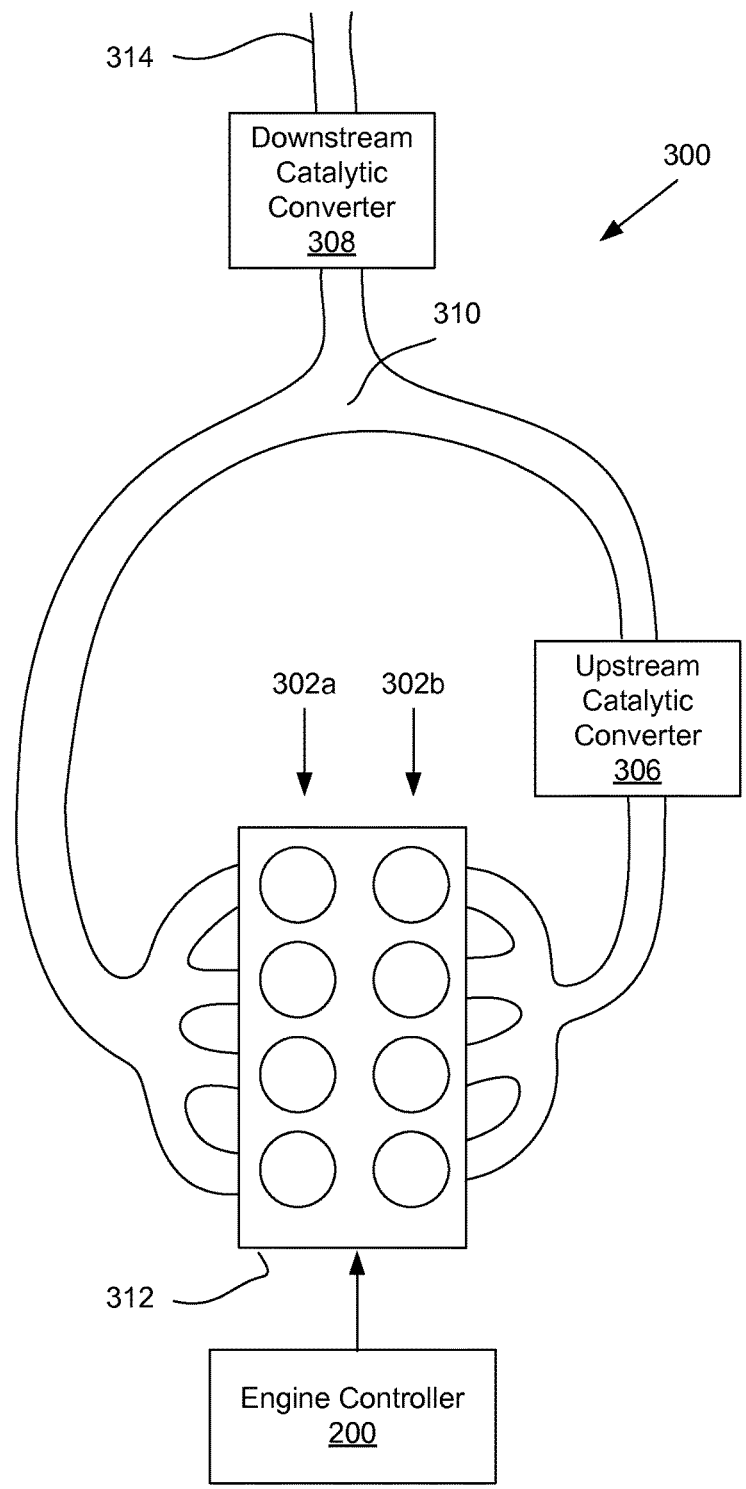
FIG. 3 is an engine exhaust system according to a particular embodiment of the present invention.

Referring next to FIG. 3, a novel form of engine exhaust system 300 will be described. The engine exhaust system 300 may have an upstream catalytic converter 306 and a downstream catalytic converter 308. The catalytic converters are coupled with an engine 312. An engine controller 200 (e.g., the engine controller 200 of FIG. 2) orchestrates the operation of the engine 312. The engine 312 includes two banks or subsets of working chambers 302a/302b.

In comparison to the prior art architecture illustrated in FIG. 1, the engine exhaust system 300 includes an asymmetrical design involving a different arrangement of catalytic converters. More specifically, one of the subsets of working chambers (first subset 302a) is not directly connected to an upstream catalytic converter. Instead, the exhaust manifold for this subset of working chambers leads to a Y pipe 310 and the Y pipe 310 is connected to a downstream catalytic converter 308. The other subset of working chambers (second subset 302b) is connected via a separate exhaust manifold to an upstream catalytic converter 306. The upstream catalytic converter is also connected to the Y pipe 310. Thus, exhaust gases generated by combustion in the second subset of working chambers 302b pass through a catalytic converter (upstream catalytic converter 306) before passing through the downstream catalytic converter 308. However, the exhaust gases generated by combustion in the first subset of working chambers 302a do not pass through any catalytic converter before they pass through the same downstream catalytic converter 308. The downstream catalytic converter 308 is connected in turn to a tailpipe 314. Exhaust passes through the downstream catalytic converter 308 and is released into the ambient environment from the tailpipe 314.

During the engine startup period, the engine controller is arranged to only fire the second subset of working chambers 302b. During that time, fuel is not delivered to the first set of working chambers 302a and/or they are skipped. Since firings are concentrated only in the second subset of working chambers 302b, the associated upstream catalytic converter 306 is heated much faster than would be the case in the exhaust system of FIG. 1. In the prior art exhaust system of FIG. 1, all of the cylinders are fired to warm up two upstream catalytic converters. This takes more time, since the energy from the firings is divided between two separate catalytic converters.

The exhaust that passes through the upstream catalytic converter passes through and warms the downstream catalytic converter 308. After the engine startup period and/or after the engine controller 200 determines that the downstream catalytic converter 308 has reached a suitable, predetermined light off temperature, the engine controller will operate the engine in a normal manner. In other words, firings may now take place also in the first subset of working chambers 302a as well as the second subset of working chambers 302b. By this time, the downstream catalytic converter 308 has been warmed by gases received from the upstream catalytic converter 306. Thus, exhaust generated by the combustion in the first subset of working chambers 302a will be adequately filtered by the downstream catalytic converter 308. Upstream catalytic converter 306 may be smaller than downstream catalytic converter 308. This allows upstream catalytic converter 306 to be quickly heated by the exhaust gases from the engine 312. Quick heating enables the upstream catalytic converter 306 to more quickly reach the light off temperature necessary for effective catalyst operation, minimizing undesirable tailpipe 314 emissions.

It should be appreciated that the engine controller 200 can operate the engine 312 using any of the features, operations or mechanisms that were described above in connection with FIG. 2. In various embodiments, for example, the engine controller 200 may utilize one or more of the aforementioned three modes of skip fire operation. That is, during some working cycles, skipped working chambers may be sealed and deactivated. During other working cycles, air may be allowed to pass through the skipped working chambers. In various approaches, rich air fuel mixtures are delivered to the fired working chambers. Under other conditions, a normal air fuel ratio is used. The present invention also contemplates operating the working chambers 302a/302b in a variable displacement mode rather than a skip fire mode. That is, in the variable displacement mode and during the engine startup phase, the second set of working chambers 302b are fired and the first set of working chambers are deactivated. Once the engine startup period has passed and/or when the downstream catalytic converter 308 has reached its light off temperature, normal engine operation (e.g., involving the firing of all the working chambers) begins.

Although FIG. 3 illustrates a particular design, it should be appreciated that a wide variety of approaches may be used. The present invention contemplates any engine exhaust system design in which exhaust from one set of working chambers passes through a different number of catalytic converters then exhaust from another set of working chambers. This design allows for more rapid heating of the catalytic converters, which means that fewer undesirable pollutants are released into the atmosphere during the engine startup period. Additionally, relative to prior art designs such as the one illustrated in FIG. 1, potentially fewer and smaller catalytic converters are required, which may reduce production costs.

Any and all of the described components may be arranged to refresh their determinations/calculations very rapidly. In some preferred embodiments, these determinations/calculations are refreshed on a working cycle by working cycle basis although, that is not a requirement. An advantage of the working cycle by working cycle operation of the various components is that it makes the controller very responsive to changed inputs and/or conditions. Although working cycle by working cycle operation is very effective, it should be appreciated that the various components can be refreshed more slowly while still providing good control (as for example by refreshing every revolution of the crankshaft, every two or more working cycles, etc.).

In many preferred implementations, firing decisions are made on a firing opportunity by firing opportunity basis. This does not mean that the decision is necessarily made at the same time as the actual firing. In some implementations, the firing decisions are made contemporaneously, but not necessarily synchronously, with the firing events. That is, a firing decision may be made immediately preceding or substantially coincident with the firing opportunity. In other embodiments, the firing decision for a specific working chamber may be made one or more working cycles prior to the firing/skip event. For example, in a particular embodiment involving a four stroke, eight cylinder engine, the firing decision is made approximately one working cycle or eight firing opportunities before the firing/skip event, although in other embodiments the firing decision may be made earlier or later. Furthermore, although many implementations independently make the firing decision for each working chamber firing opportunity, in other implementations it may be desirable to make multiple (e.g., two or more) decisions at the same time.

The invention has been described primarily in the context of controlling the skip fire operation of 4-stroke piston engines suitable for use in motor vehicles. However, it should be appreciated that the described skip fire operation approaches are very well suited for use in a wide variety of internal combustion engines. These include engines for virtually any type of vehicle—including cars, trucks, boats, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles.

Most of the skip fire controller embodiments described above utilize sigma delta conversion. Although it is believed that sigma delta converters are very well suited for use in this application, it should be appreciated that the converters may employ a wide variety of modulation schemes. For example, pulse width modulation, pulse height modulation, CDMA oriented modulation or other modulation schemes may be used to deliver the drive pulse signal. Some of the described embodiments utilize first order converters. However, in other embodiments higher order converters may be used.

It should be also appreciated that any of the operations described herein may be stored in a suitable computer readable medium in the form of executable computer code. The operations are carried out when a processor executes the computer code. Such operations include but are not limited to any and all operations performed by the engine controller, the firing fraction calculator, the firing timing determination unit, the transition module or any other module, component or controller described in this application.

The described embodiments work well with skip fire engine operation. In some implementations, working chambers are fired under close to optimal conditions. That is, the desired torque output is met primarily by varying the firing frequency. In some embodiments, during the firing of working chambers the throttle is positioned to maintain a manifold absolute pressure greater than 60, 80, 90 or 95 kPa. The described embodiments work well in allowing low emission start up over a wide range of conditions. For example, passenger vehicles need to operate from a cold start at temperatures from below −20° C. to above 40° C. Likewise they need to operate over a wide range of atmospheric pressures from below sea level to above 4,000 meters. Moreover the engine starting conditions may not necessarily correspond to a cold start, since the timing and operating duration of the last engine operating cycle can vary. The embodiments described here allow the engine controller to determine an appropriate firing sequence to deliver the requested engine torque simultaneously with minimizing noxious emissions until the catalytic converter has reached its operational temperature. Control in this manner can also minimize fuel consumption and provide acceptable levels of NVH (noise, vibration, and harshness) to ensure passenger comfort.

The systems and methods described herein may be particularly applicable to a hybrid vehicle having an internal combustion engine and electric motor/generator. Vehicles of this type tend to have more start and stop cycles than vehicles using only an internal combustion engine for propulsion. Stopping and starting the internal combustion engine will lead to variations in the catalytic converter temperature, which may degrade catalytic converter performance, particularly when restarting the internal combustion engine. Use of the invention may allow both better control over the catalytic converter temperature and longer off cycle times of the internal combustion engine, improving engine efficiency and reducing emissions.

Although only a few embodiments of the invention have been described in detail, it should be appreciated that the invention may be implemented in many other forms without departing from the spirit or scope of the invention. For example, the above description discusses three modes of skip fire engine operation. Not all embodiments require the use of all three modes. That is, the present invention contemplates designs that use one, two or three of the modes, including possibly other engine operation modes (e.g, all-cylinder mode, variable displacement mode, etc.) This application also often refers to the term, "catalytic converter." It should be appreciated that this term encompasses any suitable type of emission control device. Various parts of the application refer to the use of a catalytic converter temperature model. It should be appreciated that the model may or may not involve directly detecting or measuring the temperature of a catalytic converter. In some approaches, for example, the model does not require explicitly calculating a temperature value for the catalytic converter. Instead, it may involve determining or monitoring one or more related parameters (e.g., oxygen data, exhaust gas temperature, barometric pressure, ambient temperature, etc.) that are related to the catalytic converter temperature. In the claims and specification, there are also references to certain operations being triggered based on whether a temperature of a catalytic converter is determined to be too low or too high. Again, it should be understood that this does not necessarily mean that the temperature of the catalytic converter must be directly measured or calculated. A determination involving a temperature of a catalytic converter can also be made using other parameters that individually or collectively correspond at least partially to the catalytic converter temperature. Therefore, the present embodiments should be considered illustrative and not restrictive and the invention is not to be limited to the details given herein.

What is claimed is:

1. An engine controller for operating an internal combustion engine in a skip fire manner, the engine controller including a plurality of working chambers, the engine controller comprising:
   a catalytic monitor arranged to obtain data relating to a temperature of a catalytic converter wherein the catalytic converter temperature data is obtained from one selected from the group consisting of a catalytic converter temperature model and a sensed catalytic converter temperature; and
   a firing timing determination unit that is arranged to determine a firing sequence for operating the working chambers of the engine in a skip fire manner wherein the firing sequence is generated at least in part based on the catalytic converter temperature data; and
   wherein the firing timing determination unit is arranged to perform firings only in a first subset of the working chambers and not in a second subset of the working chambers during an engine startup period.

2. An engine controller as recited in claim 1 wherein the catalytic converter temperature model is based on one or more selected from the group consisting of oxygen sensor data, exhaust gas temperature, ambient temperature, ambient humidity, barometric pressure and engine coolant temperature.

3. An engine controller as recited in claim 1 wherein the engine controller is arranged to generate the firing sequence during an engine startup period that takes place immediately after the engine is activated from a cold start.

4. An engine controller as recited in claim 1 wherein the firing sequence is determined on a firing opportunity by firing opportunity basis.

5. An engine controller as recited in claim 1 wherein the operation of the engine in a skip fire manner involves firing at least one selected working cycle of at least one selected working chamber and skipping at least one selected working cycle of at least one selected working chamber wherein individual working chambers are sometimes skipped and sometimes fired.

6. An engine controller for operating an internal combustion engine in a skip fire manner, the engine controller including a plurality of working chambers, the engine controller comprising:
   a catalytic monitor arranged to obtain data relating to a temperature of a catalytic converter wherein the catalytic converter temperature data is obtained from one selected from the group consisting of a catalytic converter temperature model and a sensed catalytic converter temperature; and
   a firing timing determination unit that is arranged to determine a firing sequence for operating the working chambers of the engine in a skip fire manner wherein the firing sequence is generated at least in part based on the catalytic converter temperature data, wherein,
      the operation of the engine in a skip fire manner involves firing at least one selected working cycle and skipping at least one selected working cycle;
      the skipping of at least one selected working cycle involves delivering air to at least one selected working chamber, thereby passing oxygen to the catalytic converter; and
      unburnt hydrocarbon is delivered to the catalytic converter such that unburnt hydrocarbon reaches the catalytic converter and exothermically reacts with the oxygen from the skipped working chambers, thereby heating the catalytic converter.

7. An engine controller as recited in claim 6 wherein heating of the catalytic converter during an engine startup period is performed using exhaust gases, the excess fuel and the air generated through the skip fire operation of the working chambers and does not require an additional pump for delivering air to the catalytic converter.

8. An engine controller as recited in claim 7 wherein the firing timing determination unit is arranged to perform firings only in a first subset of the working chambers and not in a second subset of the working chambers during the engine startup period.

9. An engine controller for operating an internal combustion engine in a skip fire manner, the engine controller including a plurality of working chambers, the engine controller comprising:
   a catalytic monitor arranged to obtain data relating to a temperature of a catalytic converter wherein the catalytic converter temperature data is obtained from one selected from the group consisting of a catalytic converter temperature model and a sensed catalytic converter temperature; and
   a firing timing determination unit that is arranged to determine a firing sequence for operating the working chambers of the engine in a skip fire manner wherein the firing sequence is generated at least in part based on the catalytic converter temperature data; and
   wherein the engine controller is arranged to determine whether a temperature of the catalytic converter is above a predetermined threshold; and
   wherein if it is determined that the temperature of the catalytic converter is above the predetermined threshold, the engine controller is arranged to pass additional air using skipped working chambers to the catalytic converter, thereby helping to cool the catalytic converter until a desired temperature level is reached.

10. An engine controller as recited in claim 1 wherein the firing timing determination unit uses a sigma delta converter to determine the firing sequence.

11. An engine controller as recited in claim 1 further comprising a firing fraction calculator that is arranged to determine a firing fraction that delivers a desired torque wherein:
   the firing sequence is based at least partly on the firing fraction; and
   the firing fraction is determined based at least partly on one selected from the group consisting of oxygen sensor data, exhaust gas temperature, catalytic converter temperature, ambient temperature, barometric pressure and engine coolant temperature.

12. A method for controlling a temperature of a catalytic converter using skip fire engine control, the method comprising:
   obtaining data relating to a temperature of a catalytic converter wherein the catalytic converter temperature data is obtained from one selected from the group consisting of a catalytic converter temperature model and a sensed catalytic converter temperature; and
   determining a firing sequence for operating the working chambers of the engine in a skip fire manner wherein the firing sequence is generated at least in part based on the catalytic converter temperature data;
   during at least one skipped working cycle in the firing sequence, delivering air to and pumping air through at least one selected working chamber, thereby passing oxygen to the catalytic converter; and causing unburnt hydrocarbon to be delivered to the catalytic converter such that the unburnt hydrocarbon exothermically reacts with the oxygen passed through the at least one selected working chamber during the at least one skipped working cycle, thereby heating the catalytic converter.

13. A method as recited in claim 12 wherein the catalytic converter temperature model is based on one or more selected from the group consisting of oxygen sensor data, exhaust gas temperature, ambient temperature, barometric pressure and engine coolant temperature.

14. A method as recited in claim 12 wherein the engine controller is arranged to generate the firing sequence during an engine startup period that takes place immediately after the engine is activated from a cold start.

15. A method as recited in claim 12 wherein the firing sequence is determined on a firing opportunity by firing opportunity basis.

16. An engine exhaust system for an internal combustion engine having a plurality of working chambers, the plurality of working chambers including a first subset of working chambers and a second subset of working chambers, the first and second subsets of working chambers being mutually exclusive, the engine exhaust system comprising:
   an upstream catalytic converter that is coupled with and is arranged to receive exhaust gases from only the first subset of working chambers of the engine; and
   a downstream catalytic converter that is coupled to the upstream catalytic converter and is arranged to receive gases from the upstream catalytic converter wherein the downstream catalytic converter is connected with the second set of working chambers such that exhaust gases from the second set of working chambers do not pass through any catalytic converter before being received at the downstream catalytic converter; and
   a tailpipe that is coupled with the downstream catalytic converter.

17. An engine exhaust system as recited in claim 16 further comprising:
   a Y pipe that is connected with the tailpipe, the Y pipe and tailpipe arranged such that gases passing from the Y pipe to the tailpipe pass through the downstream catalytic converter; and
   a piping system that separately connects the first and second subsets of working chambers with the Y pipe such that exhaust gases from the first subset of working chambers pass through the upstream catalytic converter before reaching the Y pipe and exhaust gases from the second subset of working chambers do not pass through any catalytic converter before reaching the Y pipe.

18. An engine exhaust system as recited in claim 16, further comprising an engine controller that is arranged to operate the working chambers in a skip fire manner such that firings take place in the first subset of working chambers and not in the second subset of working chambers during a startup period of the engine.

19. An engine exhaust system for an internal combustion engine having a plurality of working chambers, the plurality of working chambers including a first subset of working chambers and a second subset of working chambers, the engine exhaust system comprising:
   an upstream catalytic converter that is coupled with and is arranged to receive exhaust gases from the first subset of working chambers of the engine;
   a downstream catalytic converter that is coupled to the upstream catalytic converter and is arranged to receive gases from the upstream catalytic converter wherein the downstream catalytic converter is connected with the second set of working chambers such that exhaust gases from the second set of working chambers do not pass through any catalytic converter before being received at the downstream catalytic converter;
   a tailpipe that is coupled with the downstream catalytic converter; and
   an engine controller that is arranged to operate the working chambers in a skip fire manner such that firings take place in the first subset of working chambers and not in the second subset of working chambers during a startup period of the engine, and wherein the engine controller is further arranged to fire at least one selected working cycle of at least one selected working chamber and to skip at least one selected working cycle of at least one selected working chamber wherein a rich air fuel mixture is delivered to the fired working chambers and additional air is allowed to pass through the skipped working chambers such that the excess fuel and additional air exothermically react in the catalytic converter to generate heat in the catalytic converter.

20. An engine exhaust system for an internal combustion engine having a plurality of working chambers, the plurality of working chambers including a first subset of working chambers and a second subset of working chambers, the engine exhaust system comprising:
   an upstream catalytic converter that is coupled with and is arranged to receive exhaust gases from the first subset of working chambers of the engine; and
   a downstream catalytic converter that is coupled to the upstream catalytic converter and is arranged to receive gases from the upstream catalytic converter wherein the downstream catalytic converter is connected with the second set of working chambers such that exhaust gases from the second set of working chambers do not pass through any catalytic converter before being received at the downstream catalytic converter; and
   a tailpipe that is coupled with the downstream catalytic converter; and
   an engine controller that is arranged to operate the working chambers in a variable displacement mode such that the first subset of working chambers are fired and the second subset of working chambers are deactivated during an engine startup period.

* * * * *